(12) United States Patent
Saari et al.

(10) Patent No.: US 11,796,887 B2
(45) Date of Patent: Oct. 24, 2023

(54) CAPACITIVELY CONTROLLED FABRY-PEROT INTERFEROMETER

(71) Applicant: TEKNOLOGIAN TUTKIMUSKESKUS VTT OY, Espoo (FI)

(72) Inventors: Heikki Saari, Vtt (FI); Martti Blomberg, Vtt (FI); Sari Elomaa, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 105 days.

(21) Appl. No.: 17/474,781

(22) Filed: Sep. 14, 2021

(65) Prior Publication Data

US 2022/0091471 A1 Mar. 24, 2022

(30) Foreign Application Priority Data

Sep. 22, 2020 (FI) .................................. 20205917

(51) Int. Cl.
  *G02F 1/21* (2006.01)
  *G01J 3/26* (2006.01)

(52) U.S. Cl.
  CPC ............... *G02F 1/213* (2021.01); *G01J 3/26* (2013.01)

(58) Field of Classification Search
  CPC .......... G02F 1/213; G01J 3/26; G02B 26/001; G02B 5/0808; G02B 26/0841; B81C 1/00
  See application file for complete search history.

(56) References Cited

U.S. PATENT DOCUMENTS

| 2007/0046950 A1* | 3/2007 | Brown ................. G09G 3/3466 356/519 |
| 2007/0242920 A1* | 10/2007 | Lin ...................... G02B 26/001 385/27 |
| 2009/0153844 A1 | 6/2009 | Peter et al. |
| 2010/0302660 A1 | 12/2010 | Hirokubo et al. |

(Continued)

FOREIGN PATENT DOCUMENTS

FI 125817 B 2/2016

OTHER PUBLICATIONS

International Search Report and Written Opinion dated Nov. 19, 2021 corresponding to International Patent Application No. PCT/FI2021/050568.

(Continued)

*Primary Examiner* — Tarifur R Chowdhury
*Assistant Examiner* — Akbar Hassan Rizvi
(74) *Attorney, Agent, or Firm* — SQUIRE PATTON BOGGS (US) LLP

(57) ABSTRACT

This disclosure describes a capacitively controlled Fabry-Perot interferometer which comprises a first mirror layer with a first metallic thin-film layer embedded in a first insulating layer and a second mirror layer with a second metallic thin-film layer embedded within a second insulating layer. A control region in the first metallic thin-film layer is at least partly aligned in an actuation direction with a control region in the second metallic thin-film layer. The interferometer also comprises a first control electrode and a first dielectric layer, and the first dielectric layer lies between the first control electrode and at least a part of the control region of the first metallic thin-film layer.

7 Claims, 4 Drawing Sheets

(56) References Cited

U.S. PATENT DOCUMENTS

| | | | |
|---|---|---|---|
| 2011/0235154 A1* | 9/2011 | Ji | G02B 26/001 359/290 |
| 2011/0279824 A1* | 11/2011 | Blomberg | G02B 26/001 356/519 |
| 2014/0267443 A1 | 9/2014 | Chan et al. | |
| 2016/0349423 A1* | 12/2016 | Etchin | G02B 26/001 |
| 2017/0082905 A1* | 3/2017 | Lee | G02B 26/04 |
| 2019/0265163 A1* | 8/2019 | Johansen | G01J 3/26 |
| 2020/0026063 A1 | 1/2020 | Blomberg et al. | |
| 2020/0124475 A1* | 4/2020 | Saari | G01J 3/26 |
| 2020/0232848 A1* | 7/2020 | Kautzsch | G01J 3/0259 |

OTHER PUBLICATIONS

Anna Rissanen et al., "Monolithically integrated microspectrometer-on-chip based on tunable visible light MEMS FPI," Sensors and Actuators A: Physical, vol. 182, May 13, 2012, pp. 130-135, XP028504198.

Finnish Search Report dated Apr. 13, 2021 corresponding to Finnish Patent Application No. 20205917.

Guo et al., "Wide-band large-aperture Ag surface-micro-machined MEMS Fabry-Perot interferometers (AgMFPIs) for miniaturized hyperspectral imaging," Proceedings of SPIE, SPIE Opto, vol. 10545, 2018, MOEMS and Miniaturized Systems XVII, pp. 105450U-1-105450U-9.

M. Blomberg et al., "Electrically Tunable Surface Micromachined Fabry-Perot interferometer for Visible Light," Proceedings of the Eurosensors XXIII conference, In: Procedia Chemistry 2009, vol. 1, pp. 552-555.

Anna Rissanen et al., "MOEMS miniature spectrometers using tuneable Fabry-Perot interferometers," In: Journal of Micro/Nanolithography, MEMS and MOEMS 2012, vol. 11, pp. 0230031-1-023003-6.

Edward K. Chan et al., "Electrostatic Micromechanical Actuator with Extended Range of Travel," In: Journal of Microelectromechanical Systems, vol. 9, No. 3, Sep. 2000, pp. 321-328.

* cited by examiner

CAPACITIVELY CONTROLLED FABRY-PEROT INTERFEROMETER

FIELD OF THE DISCLOSURE

This disclosure relates to Fabry-Perot optical filters, and particularly to micromechanical Fabry-Perot interferometers. The present disclosure further concerns the mechanism by which the gap between a top mirror and a bottom mirror can be controlled.

BACKGROUND OF THE DISCLOSURE

Micromechanical Fabry-Perot interferometers typically comprise a top mirror which is suspended above a bottom mirror above a substrate. The two mirrors are separated from each other by a mirror gap so that an optical tuning cavity is formed between the two mirrors. The two mirrors are at least partly transparent. Incident electromagnetic radiation can enter the tuning cavity from one side and exit it from the other side.

The light which enters the optical cavity can undergo multiple reflections between the bottom and top mirrors before it is transmitted out of the cavity. Constructive interference produces transmission peaks at wavelengths which correspond to the equation $2d=n\lambda$, where d is the height of the mirror gap and n is an integer. A first-order transmission peak corresponding to n=1 will be accompanied by higher order transmission peaks from wavelengths which meet the equation when n is greater than one. Order-sorting filters may be implemented with the Fabry-Perot filter to allow transmission only for wavelengths which correspond to one particular value of n.

Micromechanical Fabry-Perot interferometers can be arranged to filter electromagnetic radiation in a wavelength range which extends from visible light to infrared. The transmitted wavelengths can be selected by adjusting the mirror gap. Some microelectromechanical Fabry-Perot filters utilize MEMS actuators to move one mirror in relation to the other and thereby adjust the mirror gap. Document US2009153844 discloses a MEMS Fabry-Perot filter where electrostatic actuators are connected to one mirror. A problem with this actuation mechanism is that the actuators consume a lot of surface area and require many additional processing steps.

BRIEF DESCRIPTION OF THE DISCLOSURE

An object of the present disclosure is to provide an apparatus which overcomes the above problem.

The object of the disclosure is achieved by an arrangement which is characterized by what is stated in the independent claims. The preferred embodiments of the disclosure are presented in the dependent claims.

The disclosure is based on the idea of actuating relative movement between the bottom mirror and top mirror with a direct electrostatic attractive force between the two mirrors. The electric potential of at least one of the two mirrors is set through a capacitively coupled control electrode. An advantage of this arrangement is that the mirror gap can be adjusted over a broad range with high accuracy.

BRIEF DESCRIPTION OF THE DRAWINGS

In the following the disclosure will be described in greater detail by means of preferred embodiments with reference to the accompanying drawings, in which
FIG. 1c illustrates an equivalent circuit for the device shown in FIG. 1a.

DETAILED DESCRIPTION OF THE DISCLOSURE

This disclosure describes a capacitively controlled Fabry-Perot interferometer. The interferometer comprises a first mirror layer which comprises a first metallic thin-film layer embedded in a first insulating layer. The first metallic thin-film layer comprises a central region and a control region.

The interferometer also comprises a second mirror layer which comprises a second metallic thin-film layer embedded within a second insulating layer. The second metallic thin-film layer comprises a central region and a control region. The central region of the first metallic thin-film layer is at least partly aligned in an actuation direction with the central region of the second metallic thin-film layer. The control region of the first metallic thin-film layer is at least partly aligned in the actuation direction with the control region of the second metallic thin-film layer.

The interferometer also comprises a first control electrode and a first dielectric layer. The first dielectric layer lies between the first control electrode and at least a part of the control region of the first metallic thin-film layer. The first dielectric layer is a part of the first insulating layer in which the first metallic thin-film layer is embedded. The interferometer also comprises a second control electrode which is electrically coupled to the control region of the second metallic thin-film layer.

The first mirror layer may be fixed to a substrate and the second mirror layer may be suspended over the substrate so that the two mirror layers are substantially parallel with each other. The term "actuation direction" refers to the operative direction of the interferometer. The electromagnetic radiation which is filtered by the interferometer enters and exits the interferometer in the actuation direction. The actuation direction may for example be substantially perpendicular to the first and second mirror layers and to the surface of the substrate.

If the plane of the substrate is used to define a horizontal plane, then the actuation direction may be called the vertical direction and the first mirror layer may be called the bottom mirror and the second mirror layer may be called the top mirror. However, the "top/bottom" or "up/down" terminology used in this disclosure refers only to how the device is oriented when it is manufactured. The device can be oriented in any direction when it is used, so the "actuation direction" is not necessarily vertical when the device is in use.

Figure 1A:
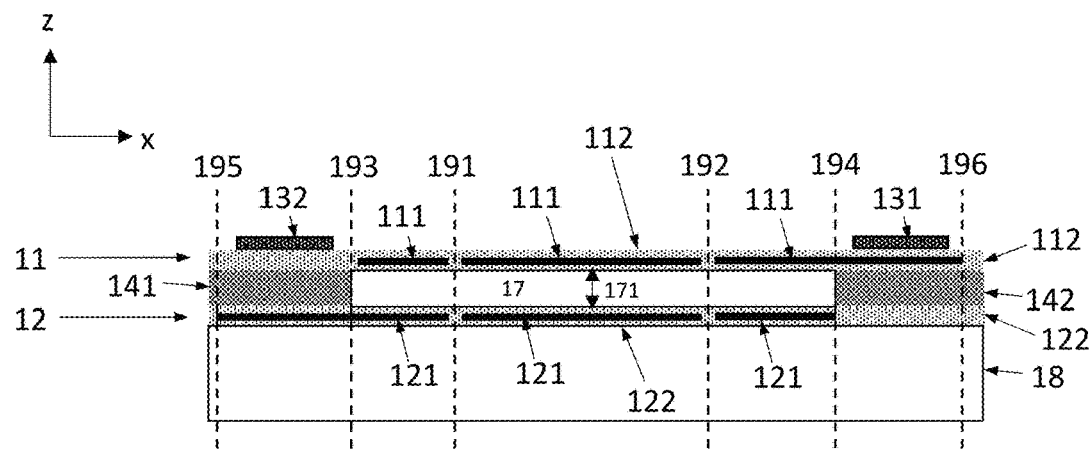
FIG. 1a illustrates a capacitively controlled Fabry-Perot interferometer.

FIG. 1a illustrates a capacitively controlled Fabry-Perot interferometer with a first mirror layer 11. The first mirror layer comprises a first metallic thin-film layer 111 embedded in a first insulating layer 112. Correspondingly, a second mirror layer 12 comprises a second metallic thin-film layer 121 embedded in a second insulating layer 122. In this case the second mirror layer 12 lies on a substrate 18, while the first mirror layer 11 is suspended above the substrate by two spacers 141 and 142, so that a tuning cavity 17 is formed between the first and second mirror layers. The substrate 18 may for example be a fused silica substrate or sapphire substrate, or any other suitable substrate with sufficient transparency for the radiation which the interferometer is designed to let through.

The substrate defines an xy-plane, indicated with the x-axis in FIG. 1a. The actuation direction is here indicated by the z-axis, and the height of the cavity 17 in the actuation direction is the mirror gap 171. The mirror gap is adjustable by an actuation force which moves the first mirror layer 11 in relation to the second mirror layer 12, as described below.

The spacers 141 and 142 can be made of an oxide layer which has been deposited at relatively a low temperature, for example a layer of tetraethyl orthosilicate (TEOS). Alternatively, they can be made of a polymeric layer. The thickness of this oxide or polymer layer typically determines (and may be equal to) the initial height of the mirror gap 171 before an actuation force is applied. The thickness of the layer which forms spacers 141 and 142 may for example be in the range 200 nm-4 μm. The optimal thickness depends, among other things, on the desired pass band wavelengths of the interferometer.

The first and second metallic thin-film layers 111 and 121 are electrically conductive and act as reflectors in each mirror layer. The layers 111 and 121 may for example be layers of silver, gold, platinum or titanium. The thickness of the first and second metallic thin-film layers 111 and 121 may be in the range 30-50 nm, or in the range of 15-60 nm.

The insulating layers 112 and 122 where the metallic thin films are embedded should have sufficiently high tensile stress to flexibly accommodate the bending which the first mirror layer 11 experiences when the actuating force narrows the mirror gap by bringing the first mirror layer 11 closer to the second mirror layer 12. The insulating layers 112 and 122 may for example may be layers of $Al_2O_3$, and their thickness may for example be in the range of 5-100 nm.

Dotted lines 191-196 divide the device into five regions along the x-axis. Both the first and the second mirror layers 11 and 12 have a central region in the region 191-192. The first mirror layer 11 has a first control region in the region 192-196 and a second control region in the region 191-193. The second mirror layer 12 has a first control region in the region 195-191 and a second control region in the region 192-194. The first and second metallic thin-film layers have central regions and control regions which correspond to the central regions and control regions of the first and second mirror layers, respectively.

The first and second metallic thin-film layers 111 and 121 may extend as continuous layers from 193 to 196 and 195 to 194, respectively. However, it is typically more beneficial to separate the central regions of the metallic thin-film layers from their control regions. In other words, the first and second metallic thin-film layers 111 and 121 may be discontinuous. The central parts of these layers in the region 191-192 may be electrically floating, while the control parts which lie in the control regions 193-191 and 192-194 may be set to specific electric potentials through capacitively or ohmically coupled control electrodes which are in capacitive contact or direct electrical contact with the control regions.

The first and second control regions of first mirror layer 11 shown in FIG. 1a may be parts of a continuous first ring-shaped control region. The first and second control regions of second mirror layer 12 may correspondingly be parts of a continuous second ring-shaped control region. The second ring-shaped control region may be aligned with the first ring-shaped control region in the actuation direction.

Figure 1B:
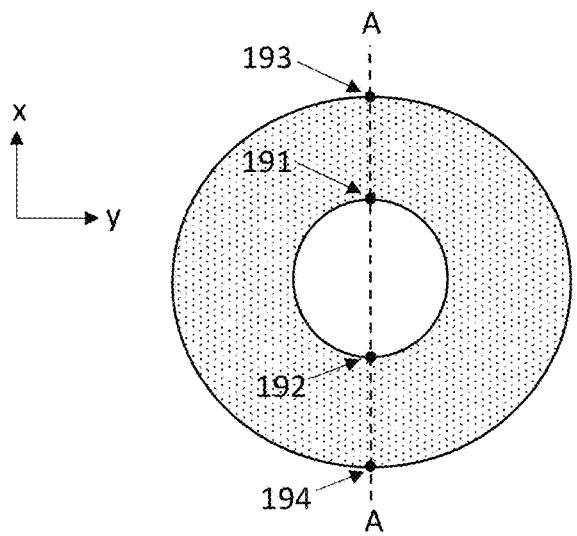
FIG. 1b illustrates a ring-shaped control area in the xy-plane.

FIG. 1b illustrates a ring-shaped control area in the xy-plane. The first and second ring-shaped control regions overlap in this control area. This control area may have the shape of a donut. The cross-section illustrated in FIG. 1a has been taken along the line A-A in FIG. 1b. This control region geometry keeps the central region of the first mirror layer 11 parallel to the central region of the second mirror layer 12 when the first mirror is actuated in the actuation direction. Other control region geometries are also possible.

The central region of the first mirror layer 11 could be larger than the central region of the second mirror layer 12, or vice versa. The first and second ring-shaped control regions of the two mirror layers would then also be of different sizes. The central region of the first mirror layer 11 must nevertheless be at least partly aligned with the central region of the second mirror layer 12 in the actuation direction, so that they overlap in the xy-plane. The area where the central regions overlap forms the optically active region of the interferometer. The control region of the first mirror layer is also at least partly aligned with the control region of the second mirror layer in the actuation direction, so that they overlap in the xy-plane. This overlap area may for example have the donut-like shape which was discussed above, or any other suitable shape.

The area where the control regions overlap forms the actuation region. An electrostatic attractive force between the mirror layers 11 and 12 is generated in this region when there is a potential difference between the control regions of the metallic thin-film layers 111 and 121. The first and second metallic thin-film layers may for example be made of silver, which has good conductivity and typically also good reflectivity in the wavelength regions which are of most interest. Any of the other materials mentioned below may also be used in the first and second metallic thin-film layers.

In the illustrated device, where the first mirror layer 11 is suspended over the substrate and the second mirror layer is fixed to the substrate 18, this attractive force pulls the first mirror layer 11 towards the substrate 18. This makes the mirror gap 171 narrower and changes the radiation wavelength, which may pass through the interferometer. The magnitude of the potential difference determines the magnitude of the electrostatic attractive force, so the first mirror layer 11 can be moved up and down by changing the potential difference.

In a different device (not illustrated), where both mirror layers are suspended in a manner which allows movement in the actuation direction, the mirror gap 171 could be narrowed/broadened by the mutual movement of the two mirror layers towards/away from each other, respectively.

The interferometer comprises a first control electrode 131, which is separated from the control region of the first metallic thin-film layer 111 by a first dielectric layer. A first control capacitor is thereby formed between the first control electrode 131 and the first metallic thin-film layer 111. In the device illustrated in FIG. 1a, the first insulating layer 112 forms the first dielectric layer in the capacitor. In other words, the first control electrode 131 has here been placed on top of the first insulating layer 112 in the part of the control region delimited by 194 and 196. In other words, the first dielectric layer is formed by the first insulating layer 112 in which the first metallic thin-film layer is embedded. If the first dielectric layer comprises multiple sublayers deposited on top of each other, the first dielectric layer may be formed by one of these sublayers. The first dielectric layer still forms a part of the first insulating layer.

If a first dielectric layer with a different thickness would be more preferable, an additional dielectric layer (not illustrated) could be added to the region 194-196 before the first control electrode 131 is deposited. This additional dielectric layer could either be placed on top of the first insulating layer 112 in FIG. 1a, or directly on top of the metallic thin-film layer 111 if the first insulating layer does not extend into the region 194-196. Other variations are also possible. The first control electrode 131 could for example be deposited on the substrate 18 in the region 194-196, and the control electrode could then be separated from the first metallic thin-film layer by both the first dielectric layer and by the spacer 142.

In other words, control capacitors are formed in the regions where each control electrode overlaps with the corresponding metallic thin-film layer. The dielectric of each control capacitor is formed at least by the first insulating layer which surrounds the metallic thin-film layer, but it may in addition also include other stacked dielectric layers such as the spacer and the second insulating layer.

The interferometer also comprises a second control electrode 132 which is electrically coupled to the control region of the second mirror layer 12. This electrical coupling may be either capacitive or ohmic. FIG. 1a illustrates an interferometer where the second control electrode 132 is capacitively coupled. The interferometer comprises a second dielectric layer, and the second dielectric layer lies between the second control electrode and at least a part of the control region of the second metallic thin-film layer, so that the second control electrode is capacitively coupled to the control region of the second metallic thin-film layer. The second dielectric layer is a part of the second insulating layer 122 in which the second metallic thin-film layer is embedded. The options described above with reference to the first dielectric layer apply to the second dielectric layer as well. A second control capacitor is thereby formed between the second control electrode 132 and the second thin-film layer 121. The first and second control electrodes 131 and 132 may for example be layers of aluminium.

In FIG. 1a the spacer 141 lies on top of the second dielectric layer in the part of the control region of the second mirror layer which is delimited by lines 195 and 193. The insulating layers 112 and 122 here also lie between the second control electrode 132 and the second metallic thin-film layer 121. Both the first and the second control electrodes 131 and 132 therefore lie on top of the first insulating layer 112 in FIG. 1a. The first and second insulating layers and the spacer 141 all lie between the second control electrode 132 and the second metallic thin-film layer 121. In other words, in FIG. 1a the first mirror layer 11 forms the top mirror, the second mirror layer forms 12 forms the bottom mirror, and the first and second control electrodes 131 and 132 lie on top of the first mirror layer 11.

Alternatively, some or all of the spacer 141 and the first insulating layer 112 could be removed in the part of the control region which is delimited by lines 195-193 so that the second control electrode can be placed closer to the second metallic thin-film layer 121. In any case, the second control electrode 132 is then still separated from the second metallic thin-film layer 121 at least by the dielectric layer which is a part of the second insulating layer 122 in which the second metallic thin-film layer 121 is embedded. The optimal thicknesses of both the first and second dielectric layers depend on the desired capacitances of the first and second control capacitors. These desired capacitances do not necessarily have to be equal.

Figure 1C:
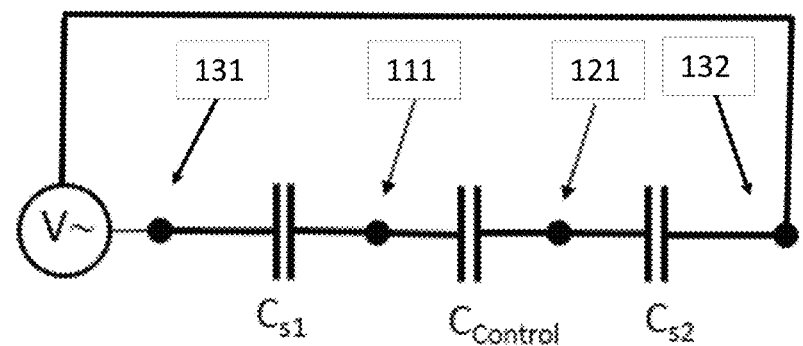

FIG. 1c illustrates an equivalent circuit for the device shown in FIG. 1a. The circuit comprises first and second control capacitors $C_{s1}$ and $C_{s2}$ coupled in series with the main control capacitor $C_{control}$ which is formed between the control regions of the first and second mirror layers in the overlap area illustrated in regions 193-191 and 192-194 and in all of FIG. 1b. An AC-voltage can thereby be coupled to between the first and second metallic thin-film layers 111 and 121 via two fixed capacitors $C_{s1}$ and $C_{s2}$ coupled in series with the main control capacitor. Typical capacitances for the first and second control capacitors are in the pF range.

In the arrangement illustrated in FIG. 1a, $C_{s1}$ will typically be much larger than $C_{s2}$ and $C_{s2}$ will then be substantially equal or smaller to $C_{control}$. If $C_{s2}$ is sufficiently small, this fixed capacitor will limit the strength of the electric field which is generated between the control regions of the two metallic thin-film layers (i.e. it limits the electric field acting in the main control capacitor). When the mirror gap is narrowed, the strength of the electric field will not undergo a dramatic increase in proportion to the inverse of the mirror gap. Instead, the fixed capacitor facilitates a more level increase which allows the mirror gap to be made quite narrowed by as much as two thirds from its rest position without risk of having the two mirrors snap together.

If the material in the second dielectric layer 141 is for example silicon dioxide, with a relative permittivity of 3.8, and if the overlap area shown in FIG. 1b is 3.8 times greater than surface area of the second control capacitor in the region between 195 and 193, then a theoretical tuning range of 66% of the mirror gap from the rest position can be achieved, and the wavelengths which pass through the interferometer by constructive interference can be adjusted in the range 300 nm-3000 nm.

Figure 1D:
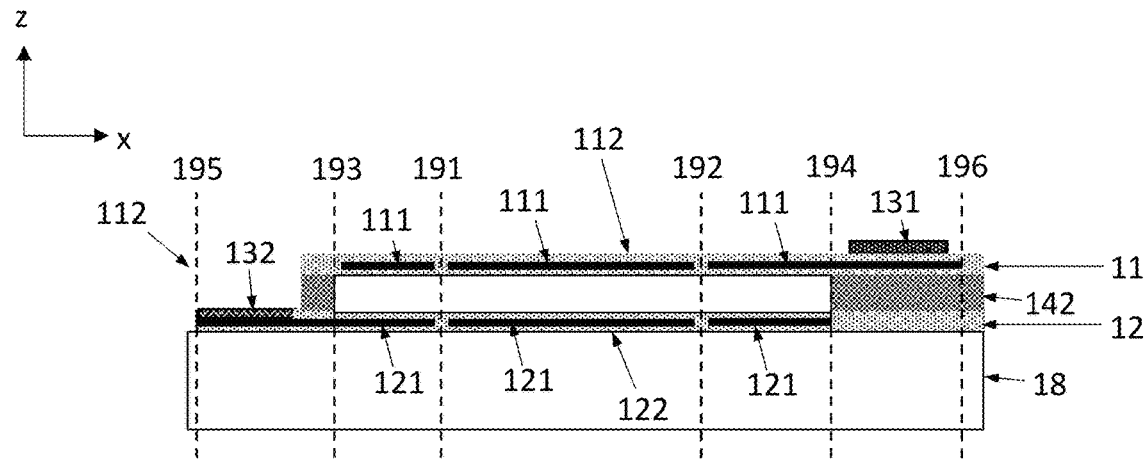
FIG. 1d illustrates a device where one control electrode is in direct electrical contact with a metallic thin-film layer.

FIG. 1d illustrates an alternative device where the second control electrode is in direct electrical contact with the second metallic thin-film layer in the control region of the second metallic thin-film layer, so that the second control electrode is ohmically coupled to the control region of the second mirror layer. In this case, the other control electrode is capacitively coupled forming a serial capacitance, which enables optimal control properties of the Fabry-Perot device.

All reference numbers in FIG. 1d illustrate the same device components as they do in FIG. 1a, and the same materials which were listed above may be used in each component. The only difference is that the second control electrode 132 in FIG. 1d lies directly on top of the second metallic thin-film layer 121 in the control region of the second mirror layer between 195 and 193. This arrangement may in some cases simplify the required drive electronics. In FIG. 1d the first mirror layer 11 forms the top mirror, the second mirror layer forms 12 forms the bottom mirror, the first control electrode 131 lies on top of the first mirror layer 11 and the second control electrode 132 lies in an opening which extends down to the second metallic thin-film layer 121.

The capacitive actuation control described above may lead to build-up of static charge on the metallic thin film layers when the device is in use. This can give rise to a DC voltage between the first and second metallic thin-film layers, which may disturb the operation of the device. To avoid the problems that static charge may cause, additional semi-insulating layers can be put in contact with the metallic thin-film layers. The first metallic thin-film layer may be in direct electrical contact with the second metallic thin-film layer via one or more semi-insulating layers at one or more short-circuiting points.

The frequency of the AC actuation voltages applied to the control electrodes is typically so high that the presence of semi-insulating layers will not influence the actuation force, but DC voltages are avoided when static charges can be discharged through the semi-insulating layers and/or equalized between the first and second mirror layers.

The first mirror layer may comprise a first semi-insulating layer which is embedded within the first insulating layer in direct electrical contact with the first metallic thin-film layer. The second mirror layer may comprise a second semi-insulating layer which is embedded within the second insulating layer in direct electrical contact with the second metallic thin-film layer. The first semi-insulating layer can be put in direct electrical contact with the second semi-insulating layer at one or more short-circuiting points.

Figure 2:
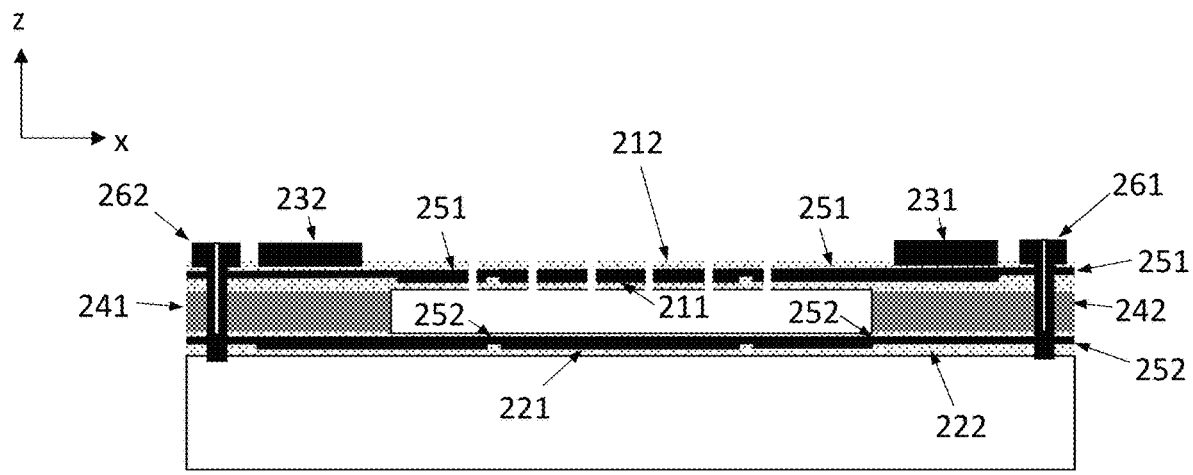
FIG. 2 illustrates a device where a semi-insulating layer can transfer charge between the mirror layers.

The first and second semi-insulating layers may for example be thin and at least partly transparent semiconducting oxide layers, for example titanium dioxide or indium-tin-oxide. FIG. 2 illustrates an interferometer where reference numbers 211-212, 221-222, 231-232 and 241-242 correspond to reference numbers 111-112, 121-122, 131-132 and 141-142, respectively, in FIG. 1a.

The interferometer in FIG. 2 also comprises a first semi-insulating layer 251 which covers the first metallic thin-film layer 211 in both its central region and control region. A second semi-insulating layer 252 correspondingly covers the second metallic thin-film layer 221 in both its central region and control region.

The first and second semi-insulating layers 251 and 252 also extend outside of the control regions to short-circuiting points 261 and 262 where they are in electrical contact with each other. In this case each short-circuiting points comprises an electrically conducting via which extends through the corresponding spacer 241/242, but the short-circuiting points could alternatively just comprise a point where layers 251 and 252 come into direct contact with each other. The conductivity of the first and second semi-insulating layers 251 and 252 is sufficient to prevent the generation of a DC field caused by static charges across the optical cavity.

Alternatively, the semi-insulating layers 251 and 252 which extend across the optically active region may be left out, and the short-circuiting points may instead comprise vias made of semi-insulating material. The formation of a DC-electric field between the first and second metallic thin-film layers 211 and 221 is then prevented by the charge equalization which occurs across these semi-insulating vias.

Semi-insulating layers may also be placed in contact with the metallic thin-film layers in the device shown in FIG. 1d, and they may be short-circuited in the manner described above. Alternatively or complementarily to any embodiment presented above, it is possible to prevent the formation of a DC electric field between the first and second metallic thin-film layers by depositing a layer of semi-insulating material on the top, bottom and sidewalls of the tuning cavity formed between the first and second mirror layers. A layer of semi-insulating material then covers the top, bottom and sidewalls of the tuning cavity and forms a Faraday cage in the tuning cavity, where no DC field will be present. Another alternative or complement to any embodiment presented above is that a layer of semi-insulating material may be deposited on top of the entire device in FIG. 1a, 1d or 2. The layer of semi-insulating material then overlies both control electrodes and first mirror layer 11.

Figure 3A:
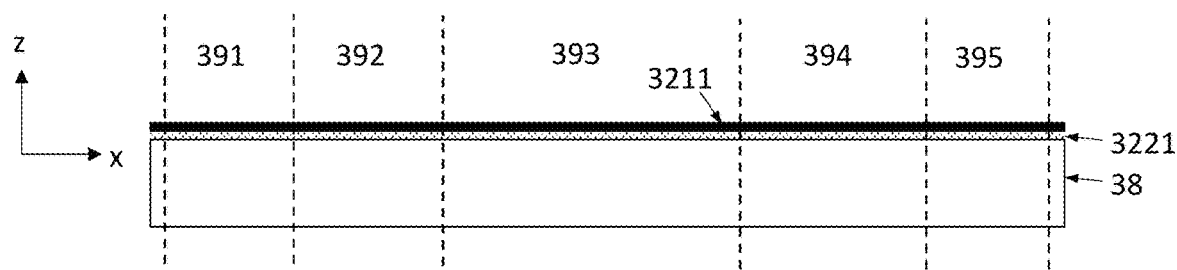
FIGS. 3a-3g illustrate a method for manufacturing a capacitively controlled Fabry-Perot interferometer.

This disclosure also describes a method for manufacturing a capacitively controlled Fabry-Perot interferometer on a substrate. This method has been illustrated in FIGS. 3a-3g. The substrate 38 comprises a first capacitor region 391, a second capacitor region 395, a central region 393 between the first capacitor region 391 and the second capacitor region 395, a first control region 392 between the first capacitor region 391 and the central region 393 and a second control region 394 between the central region 393 and the second capacitor region 395. This is illustrated in FIG. 3a.

Figure 3B:
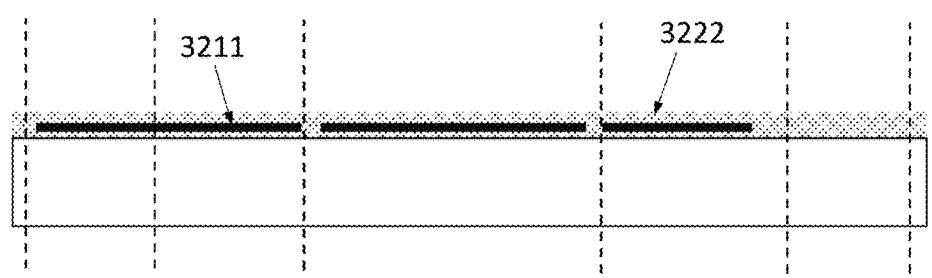

The method comprises the steps of depositing a first bottom layer of insulating material 3221 over the substrate 38, and then depositing a bottom metallic thin-film layer 3211 over the first bottom layer of insulating material 3221. This is illustrated in FIG. 3a. The method also comprises the steps of patterning the bottom metallic thin-film layer 3211 so that it extends to the first capacitor region 391, the first control region 392, the central region 393 and the second control region 394, and then depositing a second bottom layer of insulating material 3222 over the bottom metallic thin-film layer 3211, as FIG. 3b illustrates. The second bottom layer of insulating material 3222 may comprise the same insulating material as the first bottom layer of insulating material 3211. Alternatively, it may comprise a different insulating material so that the corresponding insulating layer where the metallic thin-film layer will be embedded will consist of two sublayers of different material.

Figure 3C:
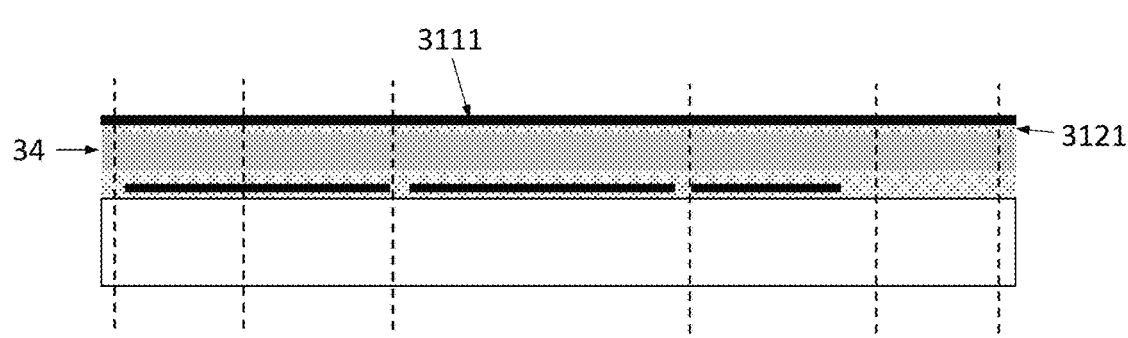

The method then comprises the steps of depositing a layer of spacer material 34 over the second bottom layer of insulating material 3222 and depositing a first top layer of insulating material 3121 over the layer of spacer material 34, and depositing a top metallic thin-film layer 3111 over the first top layer of insulating material 3121. The method then comprises the step of patterning the top metallic thin-film layer 3111 so that it extends to the first control region 392, the central region 393, the second control region 394 and the second capacitor region 395. These steps are illustrated in FIGS. 3c and 3d.

Figure 3D:
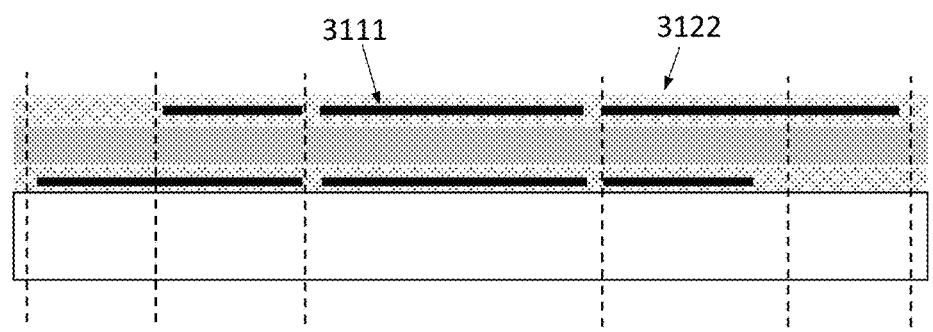
Figure 3E:
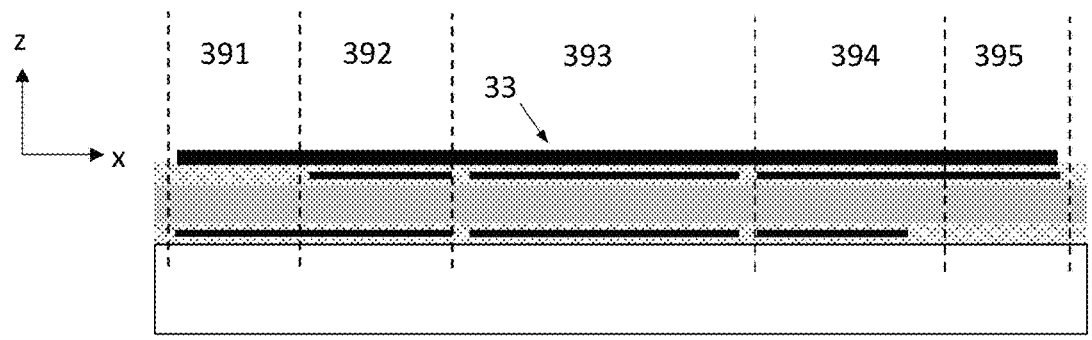

The method also comprises the step of depositing a second top layer of insulating material 3122 over the top metallic thin-film layer 3111, as illustrated in FIG. 3d. The second top layer of insulating material 3122 may comprise the same insulating material as the first top layer of insulating material 3121. Alternatively, it may comprise a different insulating material so that the insulating layer where the metallic thin-film layer will be embedded will consist of two sublayers of different material.

The method also comprises the steps of depositing a layer of conducting material 33 over the second top layer of insulating material 3122, and patterning the layer of conducting material 33 so that it forms a first control electrode 331 in the first capacitor region and a second control electrode 332 in the second capacitor region, wherein the first control electrode 331 is electrically separated from the second control electrode 332. These steps have been illustrated in FIGS. 3e and 3f.

Finally, the method also comprises the step of forming entry holes 35 in the first and second top layers of insulating material 3121-3122 and the top metallic thin-film layer 3111 at least in the central region 393, and forming a tuning cavity 37 under the first top layer of insulating material 3121 in the central region 393 and the first 392 and second 394 control regions by etching away the spacer material 34 all the way to the second bottom layer of insulating material 3222 with an etchant which reaches the spacer material 34 through the entry holes 35. These steps have been illustrated in FIG. 3g. A tuning cavity 37 is thereby formed between the second bottom layer of insulating material 3222 and the first top layer of insulating material 3121.

This method allows the masking and etching steps needed for the manufacturing of the capacitively controlled Fabry- Perot interferometer to be minimized. In the method illustrated in FIGS. 3a-3g, both control electrodes 331 and 332 which are connected to external circuitry can be easily and reliably formed on the top surface of the device. This benefit can also be obtained in the device shown in FIG. 1d if electrode 131 is placed in direct contact with metallic thin-film layer 111 (instead of 132 in contact with 121, as shown in the figure).

Figure 3F:
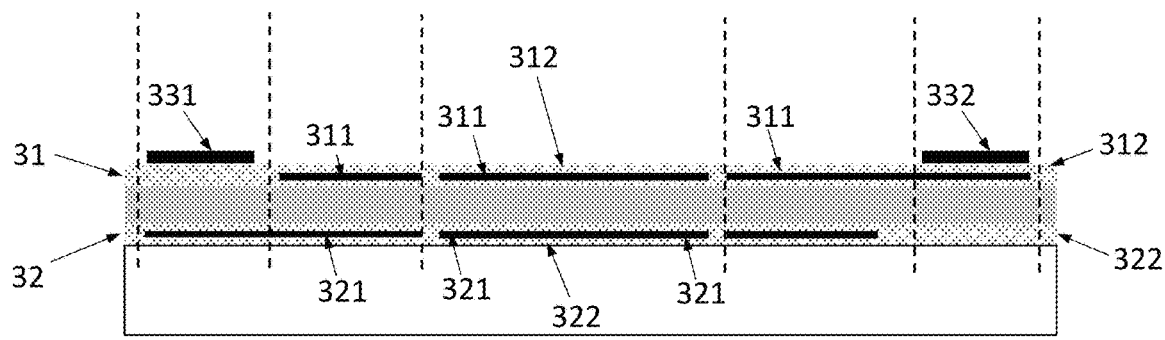
Figure 3G:
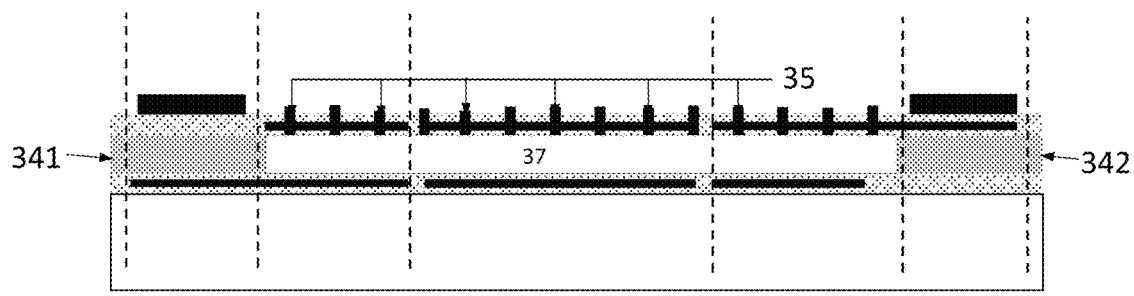

Reference numbers 31, 311-312, 32, 321-322, 331-332, 341-342 and 37 in FIGS. 3f and 3g correspond to reference numbers 11, 111-112, 12, 121-122, 131-132, 141-142 and 17, respectively, in FIG. 1a.

Layers of insulating material 3221 may for example be deposited by atomic-layer deposition (ALD) and the layers of metallic thin-film material may be deposited by sputtering, or any other suitable methods. The spacer material may be deposited with a PECVD process. The materials and thicknesses of these layers may be any of the alternatives which have been previously mentioned in this disclosure.

In the manufacturing process described above the metallic thin-film layers become embedded in the insulating and thereby form the first and second mirror layers 31 and 32. The patterning of the metallic thin-film layers is optional, as mentioned above—this layer may alternatively be a continuous layer. If the material used in the metallic thin-film layers is sensitive to the patterning process, an additional protective layer can be applied over these layers before they are patterned. This option has not been illustrated.

The etchant which is used to form the tuning cavity 37 may for example be hydrogen fluoride. The size of the entry holes 35 has been exaggerated to improve clarity, their sizes in the xy-plane may in practice be smaller in relation to the dimensions of the mirror.

The semi-insulating layers illustrated in FIG. 2 may optionally be included in the manufacturing process for example through ALD deposition at a suitable stage in the process.

The invention claimed is:

1. A capacitively controlled Fabry-Perot interferometer, said interferometer comprising:
   a first mirror layer which comprises a first metallic thin-film layer embedded in a first insulating layer, wherein the first metallic thin-film layer is configured as a first reflector in the first mirror layer, and the first metallic thin-film layer comprises a central region, and a control region;
   a second mirror layer which comprises a second metallic thin-film layer embedded in a second insulating layer, wherein the second metallic thin-film layer is configured as a second reflector in the second mirror layer, and the second metallic thin-film layer comprises a central region and a control region, and the central region of the first metallic thin-film layer is at least partly aligned in an actuation direction with the central region of the second metallic thin-film layer, and the control region of the first metallic thin-film layer is at least partly aligned in the actuation direction with the control region of the second metallic thin-film layer;
   a first control electrode and a first dielectric layer, wherein the first dielectric layer lies between the first control electrode and at least a part of the control region of the first metallic thin-film layer, wherein the interferometer comprises a first control capacitor disposed between the first control electrode and the first metallic thin-film layer, wherein the first dielectric layer is a part of the first insulating layer in which the first metallic thin-film layer is embedded, and wherein the first control electrode is on top of and is in contact with the first mirror layer; and
   a second control electrode which is electrically coupled to the control region of the second metallic thin-film layer, wherein the second mirror layer lies on a substrate, and the first mirror layer is suspended above the substrate by two spacers so that a tuning cavity is defined between the first and the second mirror layers, wherein the interferometer further comprises a second dielectric layer, wherein the second dielectric layer lies between the second control electrode and at least a part of a control region of the second metallic thin-film layer, wherein the interferometer further comprises a second control capacitor disposed between the second control electrode and the second metallic thin-film layer, wherein one of the spacers also lies between the second control electrode and the second metallic thin-film layer, and wherein the second control electrode is on top of and is in contact with the first mirror layer.

2. The capacitively controlled Fabry-Perot interferometer according to claim 1, wherein the second control electrode is in direct electrical contact with the second metallic thin-film layer in a control region of the second metallic thin-film layer.

3. The capacitively controlled Fabry-Perot interferometer according to claim 1, wherein the first metallic thin-film layer is in direct electrical contact with the second metallic thin-film layer via one or more semi-insulating layers at one or more short-circuiting points.

4. The capacitively controlled Fabry-Perot interferometer according to claim 3, wherein the first mirror layer comprises a first semi-insulating layer which is embedded within the first insulating layer in direct electrical contact with the first metallic thin-film layer, and the second mirror layer comprises a second semi-insulating layer which is embedded within the second insulating layer in direct electrical contact with the second metallic thin-film layer, and the first semi-insulating layer is in direct electrical contact with the second semi-insulating layer at the one or more short-circuiting points.

5. The capacitively controlled Fabry-Perot interferometer according to claim 1, wherein a layer of semi-insulating material covers the top, bottom and sidewalls of the tuning cavity formed between the first and second mirror layers.

6. The capacitively controlled Fabry-Perot interferometer according to claim 1, wherein the first and second metallic thin-film layers comprise silver.

7. A method of manufacturing a capacitively controlled Fabry-Perot interferometer on a substrate which comprises a first capacitor region, a second capacitor region, a central region between the first capacitor region and the second capacitor region, a first control region between the first capacitor region and the central region and a second control region between the central region and the second capacitor region, the method comprising:
   depositing a first bottom layer of insulating material over the substrate;
   depositing a bottom metallic thin-film layer over the first bottom layer of insulating material;
   patterning the bottom metallic thin-film layer so that it extends to the first capacitor region, the first control region, the central region and the second control region;
   depositing a second bottom layer of insulating material over the bottom metallic thin-film layer, wherein the second bottom layer of insulating material comprises the same insulating material as the first bottom layer of insulating material;
depositing a layer of spacer material over the second bottom layer of insulating material;
depositing a first top layer of insulating material over the layer of spacer material;
depositing a top metallic thin-film layer over the first top layer of insulating material;
patterning the top metallic thin-film layer so that it extends to the first control region, the central region, the second control region and the second capacitor region;
depositing a second top layer of insulating material over the top metallic thin-film layer, wherein the second top layer of insulating material comprises the same insulating material as the first top layer of insulating material;
depositing a layer of conducting material over the second top layer of insulating material;
patterning the layer of conducting material so that it forms a first control electrode in the first capacitor region and a second control electrode in the second capacitor region, wherein the first control electrode is electrically separated from the second control electrode;
forming entry holes in the first and second top layers of insulating material and the top metallic thin-film layer at least in the central region; and
forming a tuning cavity under the first top layer of insulating material in the central region and the first and second control regions by etching away the spacer material all the way to the second bottom layer of insulating material with an etchant which reaches the spacer material through the entry holes.

* * * * *